United States Patent
P et al.

(10) Patent No.: US 10,565,199 B2
(45) Date of Patent: Feb. 18, 2020

(54) MASSIVELY PARALLEL PROCESSING DATABASE MIDDLEWARE CONNECTOR

(71) Applicant: SAP SE, Walldorf (DE)

(72) Inventors: Shahul Hameed P, Sunnyvale, CA (US); Sinisa Knezevic, Sunnyvale, CA (US); Paul Hermens, Concord, CA (US); Petya Nikolova, Sunnyvale, CA (US); Shasha Luo, Sunnyvale, CA (US)

(73) Assignee: SAP SE, Walldorf (DE)

( * ) Notice: Subject to any disclaimer, the term of this patent is extended or adjusted under 35 U.S.C. 154(b) by 299 days.

(21) Appl. No.: 15/483,074

(22) Filed: Apr. 10, 2017

(65) Prior Publication Data

US 2018/0293275 A1 Oct. 11, 2018

(51) Int. Cl.
*G06F 7/00* (2006.01)
*G06F 16/2453* (2019.01)
*G06F 16/25* (2019.01)

(52) U.S. Cl.
CPC ...... *G06F 16/24542* (2019.01); *G06F 16/258* (2019.01)

(58) Field of Classification Search
CPC .... G06F 16/248; G06F 16/27; G06F 16/2282; G06F 16/245; G06F 16/2365; G06F 16/2322; G06F 16/2453
See application file for complete search history.

(56) References Cited

U.S. PATENT DOCUMENTS

| | | | | |
|---|---|---|---|---|
| 7,093,004 B2* | 8/2006 | Bernardin | ............... | G06F 9/505 707/999.1 |
| 8,584,136 B2* | 11/2013 | Goetz | ................... | G06F 9/5027 718/105 |
| 9,135,595 B2* | 9/2015 | Balko | ................... | G06F 9/5055 |
| 9,251,199 B2* | 2/2016 | Schiebeler | ............ | G06F 12/128 |
| 2003/0154284 A1* | 8/2003 | Bernardin | ............... | G06F 9/465 709/226 |
| 2003/0181795 A1* | 9/2003 | Suzuki | ................. | A61B 5/0002 600/300 |
| 2003/0191795 A1* | 10/2003 | Bernardin | ............... | G06F 9/505 718/105 |
| 2010/0169377 A1* | 7/2010 | Galeazzi | ............... | G06F 16/252 707/781 |

(Continued)

*Primary Examiner* — Daniel A Kuddus
(74) *Attorney, Agent, or Firm* — Sterne, Kessler, Goldstein & Fox P.L.L.C.

(57) ABSTRACT

Disclosed herein are system, method, and computer program product embodiments for a massively parallel processing (MPP) database system. The embodiments disclosed herein more quickly retrieve results from computer nodes configured to process and store distributed datasets. An embodiment operates by utilizing a middleware adapter residing in a server to send queries to a middleware controller residing in a database cluster. The queries are parsed and delivered as sub-queries to computer nodes within the database cluster. In an embodiment, sub-queries represent a query plan for faster execution. In an embodiment, the queries are also functionally translated to provide more operators than available solely based on the database cluster context. After a computer node completes the execution of a sub-query, the result is delivered directly to the middleware adapter without the need to wait for other sub-queries to complete execution.

20 Claims, 6 Drawing Sheets

(56) References Cited

U.S. PATENT DOCUMENTS

| | | | | |
|---|---|---|---|---|
| 2012/0278815 A1* | 11/2012 | Balko | .................... | G06F 9/5055 |
| | | | | 719/313 |
| 2013/0047165 A1* | 2/2013 | Goetz | .................... | G06F 9/5027 |
| | | | | 718/105 |
| 2013/0346140 A1* | 12/2013 | Balko | .................... | G06F 9/5055 |
| | | | | 705/7.26 |
| 2014/0188918 A1* | 7/2014 | Shamlin | .............. | G06F 16/2465 |
| | | | | 707/756 |
| 2015/0127599 A1* | 5/2015 | Schiebeler | ............ | G06F 12/128 |
| | | | | 707/602 |
| 2015/0137599 A1* | 5/2015 | Chung | ...................... | H02J 1/14 |
| | | | | 307/31 |
| 2016/0085809 A1* | 3/2016 | de Castro Alves | .......................... | |
| | | | | G06F 16/24568 |
| | | | | 707/736 |

\* cited by examiner

MASSIVELY PARALLEL PROCESSING DATABASE MIDDLEWARE CONNECTOR

BACKGROUND

As digitized information grows, methods for handling large amounts of data are required to effectively manage enormous datasets. So-called "big data" has become a term referring to datasets so large or complex that traditional data processing applications are inadequate. Problems arise when attempting to manage big data, including how to effectively store this big data, how to quickly retrieve the big data, and how to easily manipulate this big data. Other problems include searching the data, transferring data, analyzing the data, visualizing the data, and/or updating the data.

Often limited by hardware restrictions, data scientists and engineers are required to generate new methods for big data management. One potential solution includes using massively parallel processing (MPP). MPP refers to using a large number of processors or separate computers to perform a set of coordinated computations in parallel or simultaneously. MPP databases may also be used to process and store data by dividing big data into chunks manageable by each of the separate processors. An example of this distributed processing and storage is the Apache Hadoop® framework, which utilizes computer clusters formed from multiple pieces of commodity hardware. Apache Hive® and Spark® are also frameworks useful for integrating computer clusters.

While MPP databases have provided some improvements to tackling problems with big data, the solution is not perfect. Processing queries often requires the execution of a complete query before a result is returned. In the big data context, waiting for the completion of an entire query leads to an increase in latency between query execution and result delivery. Further, visualization and access to stored data is often difficult when attempting to manage big data as latency often prevents real time visualization.

Another problem with current systems is that queries are often sent to MPP databases as plain text queries, such as, for example, text strings. This type of query requires MPP databases to parse the queries and generate a plan for fetching results. Based on this configuration, the latency time between the receipt of a query and result generation is increased because multiple processors must communicate to determine how to parse the query.

As yet another problem, systems often fail to accommodate different contexts for data distribution, often only working for a single context. For example, functionality of the system may be limited by the query functions available to the processors of the MPP database. This single context configuration limits the types of queries and limits the functional capabilities of the MPP database.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
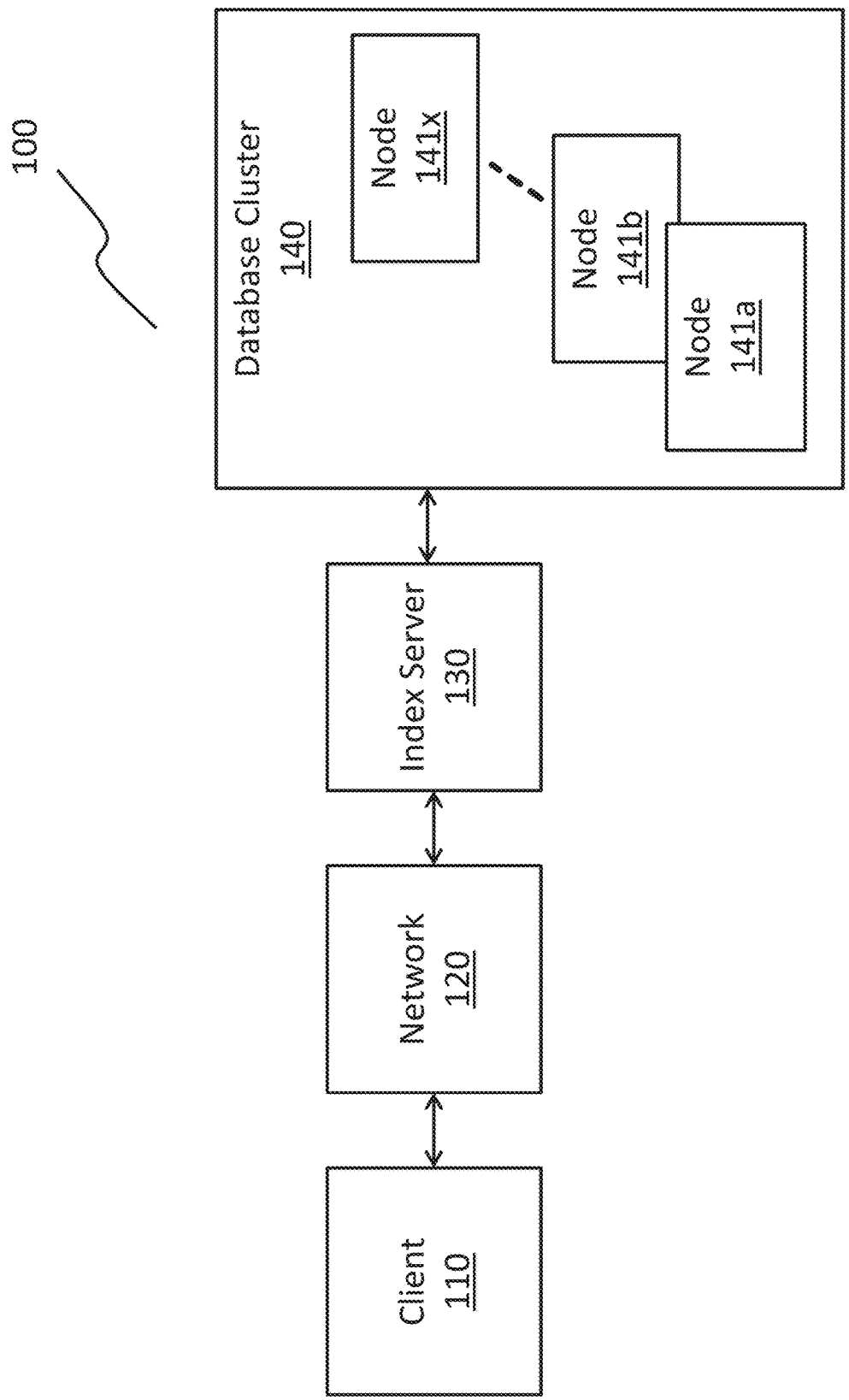
FIG. 1A is a block diagram of a massively parallel processing database system, according to some embodiments.

Provided herein are system, apparatus, device, method and/or computer program product embodiments, and/or combinations and sub-combinations thereof, for a massively parallel processing ("MPP") database system.

In an embodiment, a MPP database system utilizes a middleware adapter and a middleware controller to achieve parallel processing and parallel result generation. This system provides benefits over systems requiring a full execution of a query before results are delivered. In the embodiments disclosed, the MPP database system delivers execution results from different data nodes as soon as each data node has completed sub-query execution. Because results are delivered as soon as a node execution is complete, the delivery is not dependent on the pendency of the execution of the other nodes.

In an embodiment, to achieve this parallel result delivery, a middleware adapter and a middleware controller may be implemented in an MPP database system. The middleware adapter may reside in an index server capable of receiving and/or generating database queries. The queries may be, for example, SQL queries.

The index server may interface with a database cluster. The database cluster may include multiple nodes, such as for example, commodity hardware. In an embodiment, big data may reside on the index server, but may also be parsed and stored on the nodes of the database cluster. Thus, accessing and manipulating the data may require collecting the data from multiple sources of data storage.

To identify the appropriate storage locations, the database cluster may include a middleware controller. The middleware controller may be capable of receiving a query from a middleware adapter and parsing the query into sub-queries corresponding to the node where each portion of data is stored. The middleware controller then passes the sub-queries to the corresponding nodes where each portion of the data is stored. Each node then executes the sub-query received to generate the desired result. In an embodiment, the middleware controller may pass the query to an underlying engine, such as, for example, a Spark® engine and allow the engine to perform the query management.

When a node completes the execution of a sub-query, the result of the execution is sent to the middleware adapter without the need to wait for the completion of execution of all sub-queries. In an embodiment, the node sends a notification to the middleware controller informing the middleware controller that the node has completed execution. The middleware controller then transmits a message to the middleware adapter informing of the completion. The middleware adapter then fetches the resulting data. In an embodiment, the middleware adapter may monitor the node activity to determine when execution has completed and fetch the data directly from the node.

In this embodiment, the middleware adapter fetches results directly from the nodes of the database cluster. The middleware adapter thus fetches data from multiple channels rather than utilizing only one channel to receive the entire result of the executed query. As a result, the parallel processing features of each node may be used to execute queries in addition to parallel result delivery.

To display this updated data, another embodiment seeks to create internal tables in an index server using a federated database structure. Through the creation of internal tables in the index server, updated database information from multiple sources may be organized into a single table through the use of pointers. This embodiment allows for increased speeds in compiling received sub-query execution results. By recognizing that updated information may be received on a piece-by-piece basis, the index server may generate an internal table that is updated with results as each node completes execution. Thus, the updated internal table need not wait for the entire execution of the query before being updated. In an embodiment, an internal table may include a database entity that may be queried against, a virtual table, and/or a runtime representation of data sets common to native and/or remote tables.

In an embodiment, the middleware adapter generates a query plan based on a received query. Rather than sending a plain text query, the middleware adapter may send the query plan to the database cluster. This embodiment avoids parsing time and planning time on the database cluster side because the database cluster may be able to directly execute operations included in the query plan. In this embodiment, because the database cluster receives a query plan rather than a query, the database cluster avoids the steps of re-parsing a query and generating another query plan.

In an embodiment, an index server may receive a query from a client. The index server may parse the query to generate a query plan. The index server may then transfer the query plan to the database cluster for execution. This embodiment differs from other embodiments where the index server transmits a text or string query to the database cluster.

In an embodiment where an index server sends a text query to the database cluster, the index server may parse a received query and generate a query plan on the index server side. The index server may then send a modified query to the database cluster to fetch results. On the database cluster side, the database cluster may parse the modified query and generate another query plan to fetch results from different nodes. In this embodiment, two parsing actions occur and two query plan generation actions occur.

In contrast, by sending a query plan from the index server to the database cluster instead of a modified query, the database cluster need not re-parse the modified query and also avoids generating another query plan. This embodiment reduces additional processing time at the database cluster by not requiring the database cluster to perform the additional steps of parsing the modified query and creating another query plan. Further, the index server need not generate another text or string sub-query to send to the database cluster. Additionally, the query plan embodiment allows for the syntax of the original query received from a client to differ from the syntax of the query executed at the middleware controller and/or from the syntax executed at each node.

In an embodiment, SQL generation at the database cluster may be complex due to varying SQL dialects at the database cluster. By sharing a query plan rather than sending an SQL query, the database cluster may execute commands more quickly by avoiding the additional step of generating additional SQL queries. The query plan allows for faster query execution across heterogeneous nodes.

In an embodiment, the middleware controller may also recognize the engine context and adjust accordingly to partition and execute different types of queries. As a result, the MPP database system allows for more flexibility in the types of queries received at the middleware adapter and middleware controller.

In an embodiment, the index server may provide functionality that the database cluster does not immediately offer. The index server may be configured to receive operators from a client and translate the operators so that the database cluster will be able to return the desired result. This embodiment provides clients with more functions and query types via the index server because the client is not limited by the functions accepted by the database cluster. The index server provides a functional translation, sending native code and/or binary code to the database cluster, allowing the client to use more operators than the database cluster provided operators. In an embodiment, rather than fetching all of the results and performing filtering at the index server, the index server sends the native code to the database cluster so that the database cluster can perform the calculations and return the desired result. This embodiment reduces the number of results and/or rows that the database cluster returns to the index server because the calculations are performed at the database cluster.

These features will now be discussed with respect to the corresponding figures.

FIG. 1A is a block diagram of a massively parallel processing (MPP) database system 100, according to some embodiments. In an embodiment, MPP database system 100 comprises a client 110, a network 120, an index server 130, and a database cluster 140. Database cluster 140 includes nodes 141a, 141b, . . . , 141x. This MPP database system 100 allows client 110 to interact with database cluster 140 and nodes 141a, 141b, . . . , 141x to store, manage, and retrieve large amounts of data.

Client 110 may be any type of computing platform, such as but not limited to smartphones, tablet computers, laptop computers, desktop computers, web browsers, or any other computing device, apparatus, system, or platform. Client 110 allows a user to interact with and manipulate data stored in database cluster 140. Client 110 also acts as a device for storing data. In the context of big data, the data stored and retrieved may be on the order of tens or hundreds of gigabytes. To store and retrieve data, client 110 may utilize a network protocol to send and receive data over network 120 to index server 130. Network 120 may be any type of network capable of transmitting information either in a wired or wireless manner and may be, for example, the Internet, a Local Area Network, or a Wide Area Network. The network protocol may be, for example, a hypertext transfer protocol (HTTP), a TCP/IP protocol, Ethernet, or an asynchronous transfer mode. In an embodiment where index server 130 functions as a database management system, client 110 may send SQL or MDX statements and/or queries over network 120 to index server 130.

Index server 130 may be one or more processors, computers, or servers remote from client 110 capable of interfacing with client 110 and database cluster 140. As explained below with respect to FIG. 1B, index server 130 may include a client interface, an internal table module, and a middleware adapter. Index server 130 may include memory for data storage as well as data engines for processing data. Index server 130 may process received SQL statements in the context of authenticated sessions and transactions with a client 110. Although one client 110 is displayed in FIG. 1A, index server 130 may interface with more than one client.

In an embodiment, index server 130 is capable of implementing processing in an in-memory form, such that computation is performed in memory. This implementation allows for a faster processing speed. While index server 130 is capable of storing and manipulating data in memory stored in index server 130, index server 130 may also utilize database cluster 140 for data storage and processing. By interfacing with database cluster 140, index server 130 is capable of retaining some data while offloading certain data, such as archival data or lesser-utilized data, to database cluster 140. Database cluster 140 may then divide the offloaded data to be stored in managed across nodes 141a, 141b, . . . , 141x. Nodes 141a, 141b, . . . , 141x, may be computers or commodity hardware. Database cluster 140 may be similar to an Apache Hadoop® framework for data processing and storage.

In an embodiment, index server 130 allows for data federation capabilities, allowing for interfacing with database cluster 140 in a remote form. Federation allows index server 130 to generate an internal table of data. In an embodiment, an internal table may include a database entity that may be queried against, a virtual table, and/or a runtime representation of data sets common to native and/or remote tables. Assuming data has already been stored in database cluster 140 and partitioned into nodes 141a, 141b, . . . , 141x, the internal table in index server 130 may use a pointer to the data stored in nodes 141a, 141b, . . . , 141x. This internal table embodiment allows for the generation of a single table capable of displaying information located locally on index server 130 as well as remotely on a node 141a, 141b, . . . , 141x in database cluster 140. More than one internal table may be generated in this manner with the internal tables displaying data distributed across multiple locations in a single table. Also, by using pointers to data stored in nodes 141a, 141b, . . . , 141x, index server 130 may not need to replicate data from the database cluster into index server 130. Rather, index server 130 may be capable of querying the remote nodes 141a, 141b, . . . , 141x directly.

In an embodiment, index server 130 may receive a database query, such as an SQL query, which operates on the internal table. The internal table may point to data stored locally in index server 130 as well as data stored in in nodes 141a, 141b, . . . , 141x. If the query, or a part of the query, requires execution on data stored in nodes 141a, 141b, . . . , 141x, index server 130 may execute the part of the query to the respective node 141a, 141b, . . . , 141x. The node executes the part of the query and then returns a result to index server 130. This method of execution will be described in more detail below with respect to FIGS. 1B and 2-4.

Figure 1B:
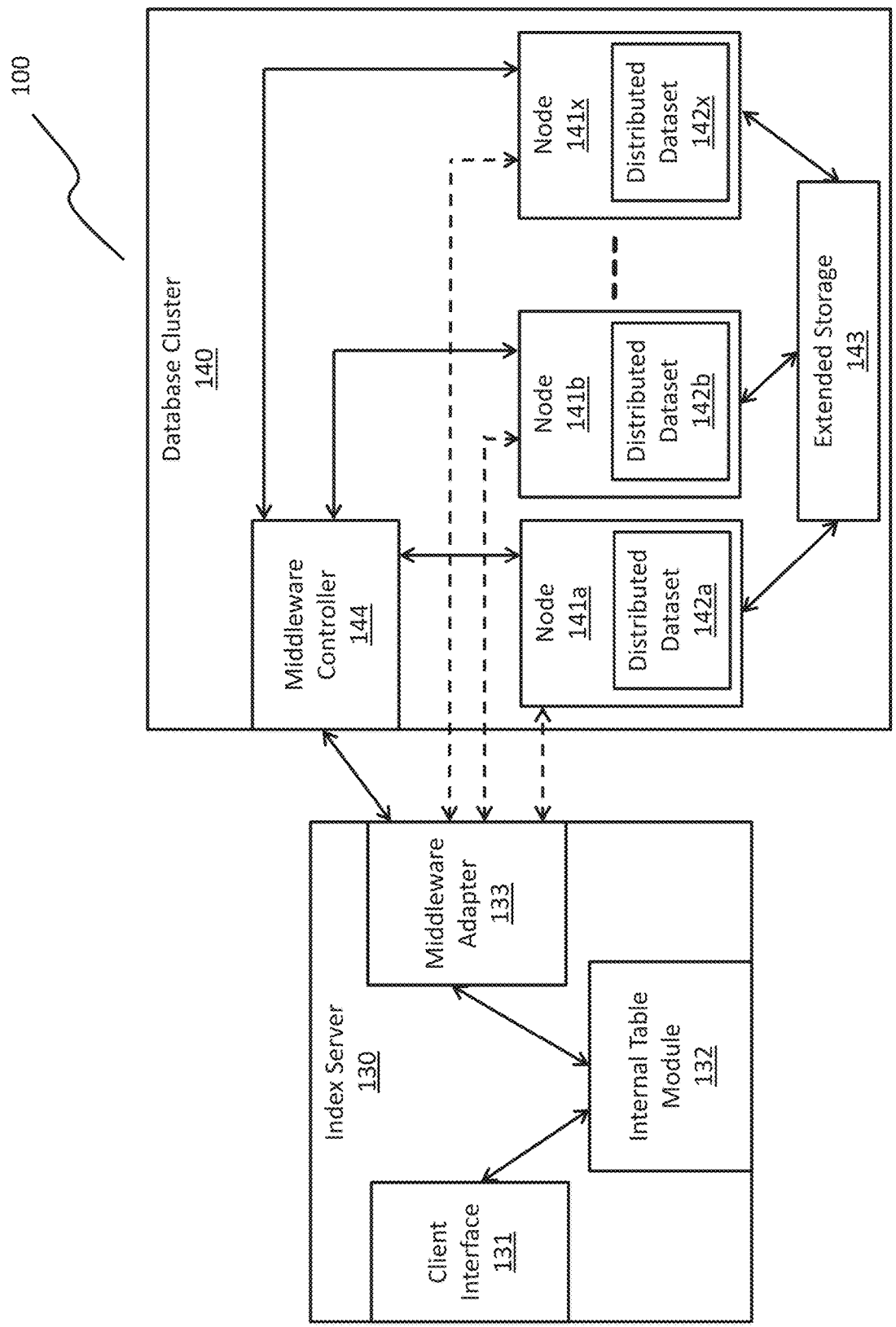
FIG. 1B is a block diagram of a massively parallel processing system including a middleware adapter and middleware controller, according to some embodiments.

In relation to client 110, which may be executing database statements utilizing the internal table, client 110 may execute statements and queries using only the internal table, rather than needing to manually direct statements or queries to nodes 141a, 141b, . . . , 141x directly. This internal table embodiment thus allows client 110 to view and manipulate data in a singular location even if the data has been partitioned and distributed across multiple sources, such as, for example, local index sever 130 storage as well as node 141a, 141b, . . . , 141x storage FIG. 1B is block diagram of a massively parallel processing system 100 including, among other modules, a middleware adapter 133 and middleware controller 144, according to some embodiments. FIG. 1B illustrates the interaction between index server 130 and database cluster 140. Index server 130 includes a client interface 131, an internal table module 132, and a middleware adapter 133. Database cluster 140 includes a middleware controller 144, extended storage 143, nodes 141a, 141b, . . . , 141x, and distributed datasets 142a, 142b, . . . , 142x located on the corresponding nodes 141. In some embodiments, utilizing middleware adapter 133 and middleware controller 144, parallel processing and parallel result delivery may be achieved, allowing for faster delivery of executed queries.

In an embodiment, index sever 130 is a server capable of storing and retrieving data as requested by client applications. Index server 130 may include one or more processors, memory, and/or other hardware used to facilitate data storage and management. A database management system may be executed on index server 130. In an embodiment, processing performed by index server 130 may occur in memory to more quickly perform computations.

Index server 130 includes a client interface 131. Client interface 131 is an interface useful for communicating with a client over a network, such as client 110 shown in FIG. 1A. Client interface 131 may be configured to send data from the index server 130 to a client and receive queries from the client. In an embodiment, clients may send database queries to index server 130 using a network and network protocol. Client interface 131 is configured to communicate with a client via the network protocol. In an embodiment, a client may send an SQL query to index server 130 via client interface 131.

In an embodiment, client interface 131 may send internal table information generated in the internal table module 132 to a client. This internal table information may be one or more tables created to organize data distributed across many nodes. For example, if data is stored in database cluster 140 but stored on different nodes 141a, 141b, . . . , 141x, the internal table module 132 may organize the information such that the data appears in one internal list. Further, rather than creating copies of the data in index server 130 or replicating the data, internal table module 132 may use pointers the remote data storage locations. In an embodiment, if data is also stored locally in index server 130, internal table module 132 may additionally create a pointer to this data, allowing a user or client to manipulate this data in a singular location. To create internal tables, internal table module 132 may utilize federation techniques in relation to nodes 141a, 141b, . . . , 141x.

Index server 130 also includes a middleware adapter 133. The middleware adapter 133 interfaces with database cluster 140 through middleware controller 144, nodes 141a, 141b, . . . , 141x, and distributed datasets 142a, 142b, . . . , 142x.

In an embodiment, middleware adapter 133 transmits queries from index server 130 to database cluster 140. A query may be generated by index server 130 or may be received from a client external to index server 130. For example, a client may have already received internal table information generated by internal table module 132. Through the manipulation of the internal table, a user or client may send a query to index server 130 via client interface 131. Middleware adapter 133 may then process the query and send the query to middleware controller 144. In an embodiment, processing the query may include identifying the context of the query. If needed for middleware controller 144 to execute the query, middleware adapter 133 may convert the query into a context suitable for middleware controller 144 execution. For example, middleware adapter 133 may convert an SQL query into a Spark® Query useful for interfacing with Hadoop® clusters.

In an embodiment, middleware adapter 133 may parse the query into two categories of sub-queries: (1) sub-queries executed by index server 130 and (2) sub-queries executed by database cluster 140. Sub-queries executed by index server 130 may include portions of the original query seeking data or manipulating data already stored in index server 130. As a result, middleware adapter 133 may directly execute these sub-queries or send the sub-query to another execution module for completion. For the sub-queries meant to be executed by database cluster 140, because the sub-query relates to information stored in database cluster 140, middleware adapter 133 may send the sub-query to middleware controller 144 for execution.

In an embodiment, middleware adapter 133 is configured to receive information from middleware controller 144 as well as nodes 141a, 141b, . . . , 141x and distributed datasets 142a, 142b, . . . , 142x. Middleware adapter 133 receives the results of queries sent to middleware controller 144 and passes the results and updated data to internal table module 132.

In an embodiment, middleware adapter 133 receives data from distributed datasets 142a, 142b, . . . , 142x on nodes 141a, 141b, . . . , 141x. After middleware adapter 133 sends a query to middleware controller 144, middleware controller 144 may parse the query into sub-queries related to nodes housing data relevant to the query. For example, if a query is meant to act on data "ABC" and data "A" resides on node 141a, data "B" resides on node 141b, and data "C" resides on node 141c, middleware controller 144 may parse the query into sub-query A, sub-query B, and sub-query C. Middleware controller 144 may then send each sub-query to the respective node housing the data related to the sub-query. For example, middleware controller 144 will send sub-query B to node 141b where data "B" resides.

At each node 141, the sub-query may be received and executed. In an embodiment, a node 141 may be a dedicated computing device capable of data processing and storage. In an embodiment, sub-query B may be sent to node 141b where the subquery will be executed on data B. An example of this execution may be a request for data. The queries may also include data manipulation, transaction controls, and/or data definition. Once the node 141b has executed the sub-query, the result of the execution may be sent directly to middleware adapter 133.

In an embodiment, rather than parsing the query into a text or string sub-query executed by database cluster 140, middleware adapter 133 may generate a query plan for transmission to middleware controller 144. Middleware controller 144 may then execute the query plan to fetch results. This embodiment differs from sending a text or string sub-query to middleware controller 144 because the query plan allows the middleware controller 144 to directly execute operators included in the query plan.

In an embodiment, the middleware adapter 133 may receive a query from a client 110 interaction with internal table module 132. The middleware adapter 133 may then generate a query plan. This query plan may identify results able to generated by index server 130 and results required from database cluster 140. The query plan may also include operators for execution at the database cluster 140. In creating this plan, middleware adapter 133 may create the query plan in a tree configuration using the top node of the tree configuration to represent the result of the query. In an embodiment, the query plan may be generated using JavaScript Object Notation® (JSON) or Extensible Markup Language (XML). The query plan may be a file or object written in the JSON or XML format. This format may differ from a text or string sub-query format, such as, for example, SQL.

After generation, middleware adapter 133 may transmit the query plan to middleware controller 144 for execution. Because the query plan includes operators that the middleware controller 144 can directly execute, the middleware controller 144 need not perform a syntax conversion. In this respect, sending a query plan differs from sending a text or string sub-query to middleware controller 144. If middleware adapter 133 sends a text or string sub-query to middleware controller 144, middleware controller 144 may parse the text or string sub-query and generate another query plan for execution among nodes 141a, 141b, . . . , 141x. By receiving a query plan at middleware controller 144, middleware controller 144 need not perform the parsing step nor the query plan generation step because middleware controller 144 may execute operators provided in the query plan received from middleware adapter 133. This embodiment reduces additional processing time at middleware controller 144 by not requiring middleware controller 144 to perform the additional steps of parsing the modified query and creating another query plan. Further, index server 130 need not generate another text or string sub-query to send to middleware controller 144. This embodiment allows for the syntax of the original query received from a client 110 to differ from the syntax of the query executed at middleware controller 144 and/or from the syntax executed at each node 141a, 141b, . . . , 141x.

In an embodiment, index server 130 may present client 110 with additional functionality not directly provided by database cluster 140. Index server 130 may provide functions or operators to client 110 that client 110 may use to query data that the nodes 141a, 141b, . . . , 141x of database cluster 140 do not provide by definition. For example, index server 130 may provide a "calendar week" function that returns the number of the calendar week corresponding to a given day. This function may not exist on the database cluster 140 side due to the capabilities of nodes 141a, 141b, . . . , 141x. Employing middleware adapter 133 and middleware controller 144, however, allows for the generation of this new functionality.

In an embodiment, results may be fetched from database cluster 140 using functions available at nodes 141a, 141b, . . . , 141x and then filtered and analyzed at index server 130 to achieve the desired functionality. This embodiment, however, may result in a large processing load based on the results requested, such as, for example, when many results are retrieved from database cluster 140 and then filtered at index server 130 to only a few results. In an embodiment, rather than fetching results first, index server 130 may translate the function into native code and/or binary code and send the native code and/or binary code to the database cluster 140. Index server 130 may also send a function definition and/or a cache of combined code to database cluster 140. In an embodiment, middleware adapter 133 may perform this function generation and transmit the code to middleware controller 144 for execution. This embodiment allows for the retrieval of results from nodes 141a, 141b, . . . , 141x that satisfy the initial query transmitted from index server 130 without the need to fetch all of the results based on the limitations of nodes 141a, 141b, . . . , 141x and filtering all of the results at index server 130 after retrieval. As a result, this embodiment reduces the amount data transferred from database cluster 140 to index server 130 and reduces the additional processing required to perform the data transfer.

In an embodiment, middleware adapter 133 directly fetches the result of the execution from the node 141 without the node transferring the data to middleware controller 144 for delivery. In this embodiment, middleware adapter 133 may fetch results without needing to wait for the completion of execution of all sub-queries, such as, for example, sub-queries A and C. In an embodiment, middleware adapter 133 monitors node 141 activity to determine when execution has completed and fetches the data directly from the node. In an embodiment, the node 141 sends a notification to middleware controller 144 informing middleware controller 144 that the node has completed execution. The middleware controller then transmits a message to middleware adapter 133 informing middleware adapter 133 of the completion of the message. Middleware adapter 133 then fetches the resulting data as each node 141 completes execution of its respective sub-query.

In an embodiment, because middleware adapter 133 fetches results directly from nodes 141, middleware adapter 133 fetches data from multiple channels rather than utilizing only one channel to receive the entire result of the executed query. As a result, parallel processing of the query sent from middleware adapter 133 may occur at each node 141 with parallel result delivery to middleware adapter 133. Middleware adapter 133 need not wait for every sub-query to complete execution before receiving results. This configuration allows middleware adapter 133 to receive results as the results are generated. In the big data context, being able to receive data in this matter allows for the faster access of data without the required latency of waiting for all sub-queries to execute. With data size being on the order of tens or hundreds of gigabytes or even terabytes, retrieving data as quickly as possible is advantageous over waiting until all of the data is retrieved over a single channel.

In an embodiment, middleware controller 144 is not utilized in returning data as a result of query execution at nodes 141. Middleware controller 144 instead manages different associations between data and data location. For example, in the Apache Hadoop® context where nodes 141 are computing devices taken together to form database cluster 140, middleware controller 144 may be a module implemented on a separate node in an Apache Spark® and/or Hive® framework. In an embodiment, middleware controller 144 controls the parsing of queries received from middleware adapter 133. In an embodiment, using the Spark® and/or Hive® contexts, middleware controller 144 may be implemented on top of the Spark® and/or Hive® so that the query is sent to a separate Spark® and/or Hive® engine for parsing and transmission to a node 141.

In an embodiment, middleware controller 144 may also recognize the engine context and partition and execute different types of queries sent from middleware adapter 133. For example, middleware controller 144 may receive an SQL query, however, nodes 141 may be operating using the Spark® engine. In order to achieve communication with nodes 141, middleware controller 144 may convert the SQL query into a Spark® form. This conversion may occur based on the configuration files associated with middleware controller 144 and the format of database cluster 140. Allowing for processing in different contexts allows middleware controller 144 to more flexibly handle different types of queries received at middleware adapter 133 and middleware controller 144.

As middleware controller 144 sends sub-queries to nodes 141, nodes 141 may execute the sub-queries to produce results corresponding to the data stored in nodes 141. In an embodiment, after nodes 141a, 141b, ..., 141x complete execution of a query, the nodes may update corresponding distributed datasets 142a, 142b, ..., 142x stored within the node. In some embodiments, distributed datasets 142 are data structures that persist throughout each node 141 and allow for multiple instances of data storage for redundancy among nodes 141. Data from different nodes 141 may be shared among the distributed datasets 142 of the other nodes. Thus, if a node 141 fails, the data in the node may be recovered using a distributed dataset 142. Distributed dataset 142 provides fault tolerance among nodes 141. In an embodiment, distributed datasets 142 may be implemented using Spark® Resilient Distributed Datasets (RDDs).

In an embodiment, middleware adapter 133 fetches results from the distributed data sets 142 of each node 141. After a node 141 has completed execution of a sub-query, the node 141 may update its corresponding distributed dataset 142. Either through monitoring or through a notification sent to middleware adapter 133, middleware adapter 133 can then fetch the data from the distributed dataset 142 of a node 141 that has completed execution of a sub-query.

In an embodiment, for a node 141 to successfully execute a sub-query, the node 141 may need to access extended storage 143. In some embodiments, extended storage 143 is memory capable of storing files, such as, for example, a file system and/or a hard disks. If a sub-query requires manipulation of data stored in extended storage 143, node 141 and/or distributed dataset 142 may interact with the extended storage through queries to obtain information about the stored files and/or manipulation of the stored files. In an embodiment, extended storage 143 may be shared and accessing by nodes 141. In an embodiment, a subset of nodes 141 may have access to extended storage 143. In an embodiment, more than one instance of extended storage 143 may exist where different nodes 141 may access different extended storages 143. In an embodiment where the Spark® engine is being used on a Hadoop® cluster, extended storage 143 may be a Hadoop®, Distributed File System (HDFS).

Figure 2:
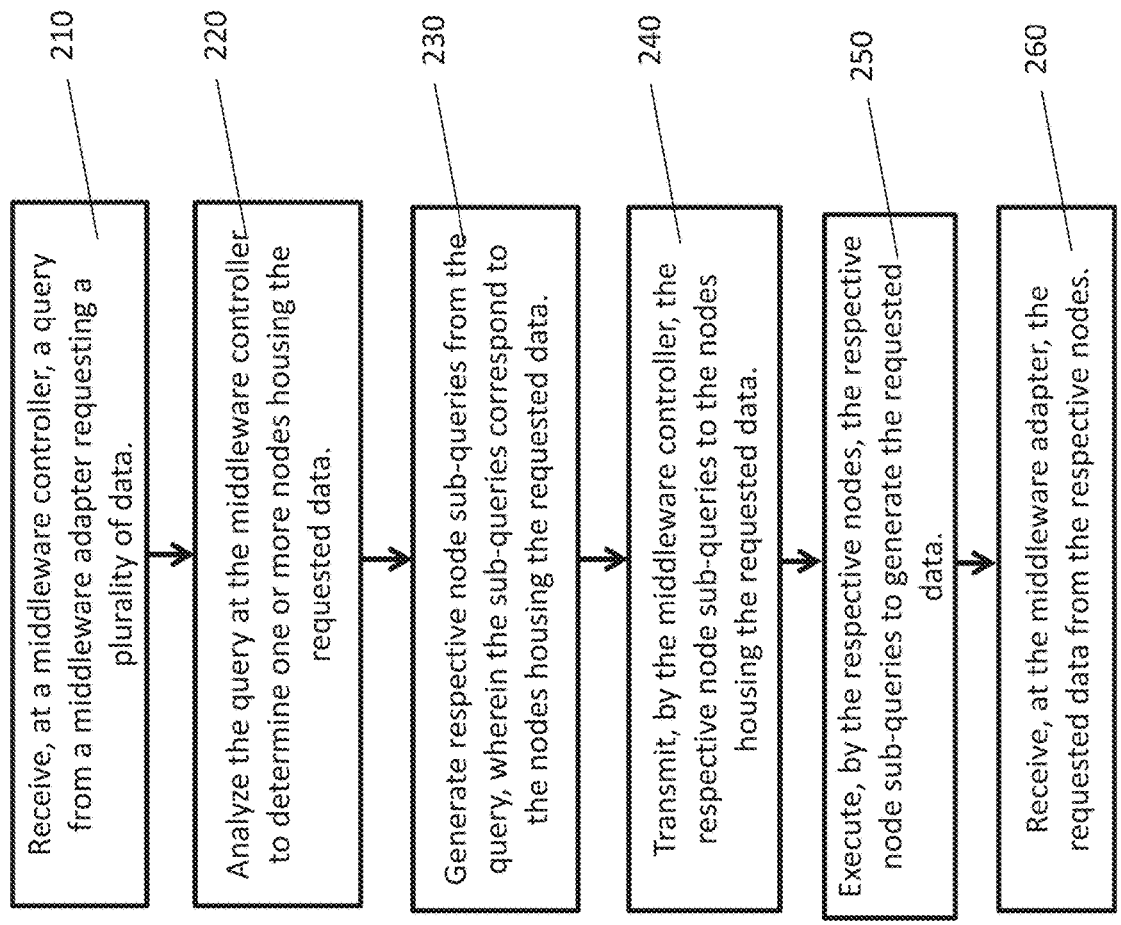
FIG. 2 is a flowchart illustrating a method for operating a massively parallel processing database system, according to some embodiments.

FIG. 2 is a flowchart illustrating a method 200 for operating a massively parallel processing database system, according to some embodiments. Method 200 describes the interaction between a middleware controller, a middleware adapter, and data nodes housing requested data. Method 200 further describes a process for obtaining results after a data node has executed a query or sub-query.

Method 200 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIGS. 1A and 1B. However, method 200 is not limited to that example embodiment.

At 210, a query requesting a plurality of data is received at a middleware controller 144 from a middleware adapter 133. The middleware adapter 133 may reside in an index server 130 remote from the middleware controller 144. The middleware controller 144 may reside in a database cluster 140 of nodes 141, with the nodes 141 housing data in a distributed configuration. The query may be in the form of a database query or a query for distributed data. In an embodiment, the query operates in a Spark® engine for managing a Hadoop® cluster. In an embodiment, queries may be requests for data, although this disclosure is not limited to that example. In an embodiment, queries may also include data manipulation, transaction controls, and/or data definition commands.

In an embodiment, the query received at the middleware controller 144 is a query plan. The query plan may include operators for execution at the database cluster 140. In an embodiment, the query plan is configured so that the middleware controller 144 can directly execute operators included in the query plan without the need to parse and/or generate a new query plan. The query plan may utilize a tree configuration using the top node of the tree configuration to represent the result of the query. In an embodiment, the query plan may be a file and/or object written in the JavaScript Object Notation® (JSON) or Extensible Markup Language (XML) format. This format may differ from a text or string sub-query format, such as, for example, SQL.

In an embodiment, the query received may be native code and/or binary code. In an embodiment, the native code and/or binary code may represent a function capable of being executed in index server 130. The received query may also include a function definition and/or a cache of combined code.

At 220, the query is analyzed at the middleware controller 144 to determine one or more nodes 141 housing the requested data. In an embodiment, the query seeks information or requires execution on a plurality of pieces of data. In a database cluster 140, this data may be stored on different nodes 141 to facilitate cheaper processing and storage relative to employing supercomputers for computation and storage. At 220, the middleware controller 144 analyzes the query to identify the nodes 141 within the database cluster 140 housing data that is requested by the query.

In an embodiment where the received query represents a query plan, the middleware controller 144 may analyze the query plan to determine how to execute each of the operators included in the query plan. In an embodiment, the query plan may include the node location of requested data.

At 230, respective node sub-queries are generated from the query, wherein the sub-queries correspond to the nodes 141 housing the requested data. For example, if a query is meant to act on data "ABC" and data "A" resides on node 141a, data "B" resides on node 141b, and data "C" resides on node 141c, a middleware controller 144 may parse the query into sub-query A, sub-query B, and sub-query C. Each sub-query will be acted upon by the respective node 141 housing the data respective to the sub-query.

In an embodiment where the received query represents a query plan, 230 may be skipped. In an embodiment, 240 may also be skipped. Because the query plan includes operations that may be executed directly, middleware controller 144 may directly transmit each of the executable commands of the query to each of the corresponding nodes. Middleware controller 144 may not be required to parse the query plan in node sub-queries.

At 240, the respective node sub-queries are transmitted by the middleware controller 144 to the nodes 141 housing the requested data. The middleware controller 144 may send each sub-query to the respective node 141 housing the data related to the sub-query. For example, the middleware controller 144 will send sub-query B to node 141b where data "B" resides. At each node 141, the sub-query will be received and executed.

At 250, the respective node sub-queries are executed by the respective nodes 141 to generate the data requested. An example of this execution may be a request for data. The queries may also include data manipulation, transaction controls, and/or data definition. Once a node 141 has executed the sub-query, the result of the execution may be stored in a distributed dataset 142 on the node 141. In an embodiment, the data in the distributed dataset 142 may be shared among nodes 141 to aid in fault tolerance. In an embodiment, to execute the respective node sub-queries, the nodes 141 may need to access extended storage 143 to read and/or manipulate file data. In this case, the nodes 141 may interface with an extended storage 143. In an embodiment, the extended storage 143 is shared among nodes 141 and may be accessed by each node 141. In an embodiment where the nodes 141 are clustered using a Hadoop® configuration and a Spark® engine, the extended storage 143 may be a Hadoop® Distributed File System (HDFS).

In an embodiment where the received query represents a query plan, the middleware controller 144 may send executable commands to the respective nodes 141. In an embodiment, the query plan may list the executable commands without the need for middleware controller 144 to generate a new sub-query for execution at the nodes 141. In this embodiment, nodes 141 may receive copies of the query plan.

At 260, the middleware adapter 133 receives the requested data from the respective nodes 141. In an embodiment, the results generated at the respective nodes 141 are sent directly to the middleware adapter 133 without needing to first pass the information to the middleware controller 144. In an embodiment, the middleware adapter 133 fetches the data directly from a node 141 when the node 141 has completed execution of its respective sub-query. To determine when the node 141 has completed execution of the sub-query the middleware adapter 133 may monitor the execution status of the sub-query and/or receive a notification from the node 141 that execution is complete. In an embodiment, the notification may be sent from the node 141 to the middleware adapter 133. In an embodiment, the notification may be sent from the node 141 to the middleware controller 144 and then sent from the middleware controller 144 to the middleware adapter 133. In either scenario, the middleware adapter 133 fetches the data directly from the node 141. The process may continue until the nodes 141 have finished execution of their respective sub-queries and have delivered the results of the execution to the middleware adapter 133.

Figure 3:
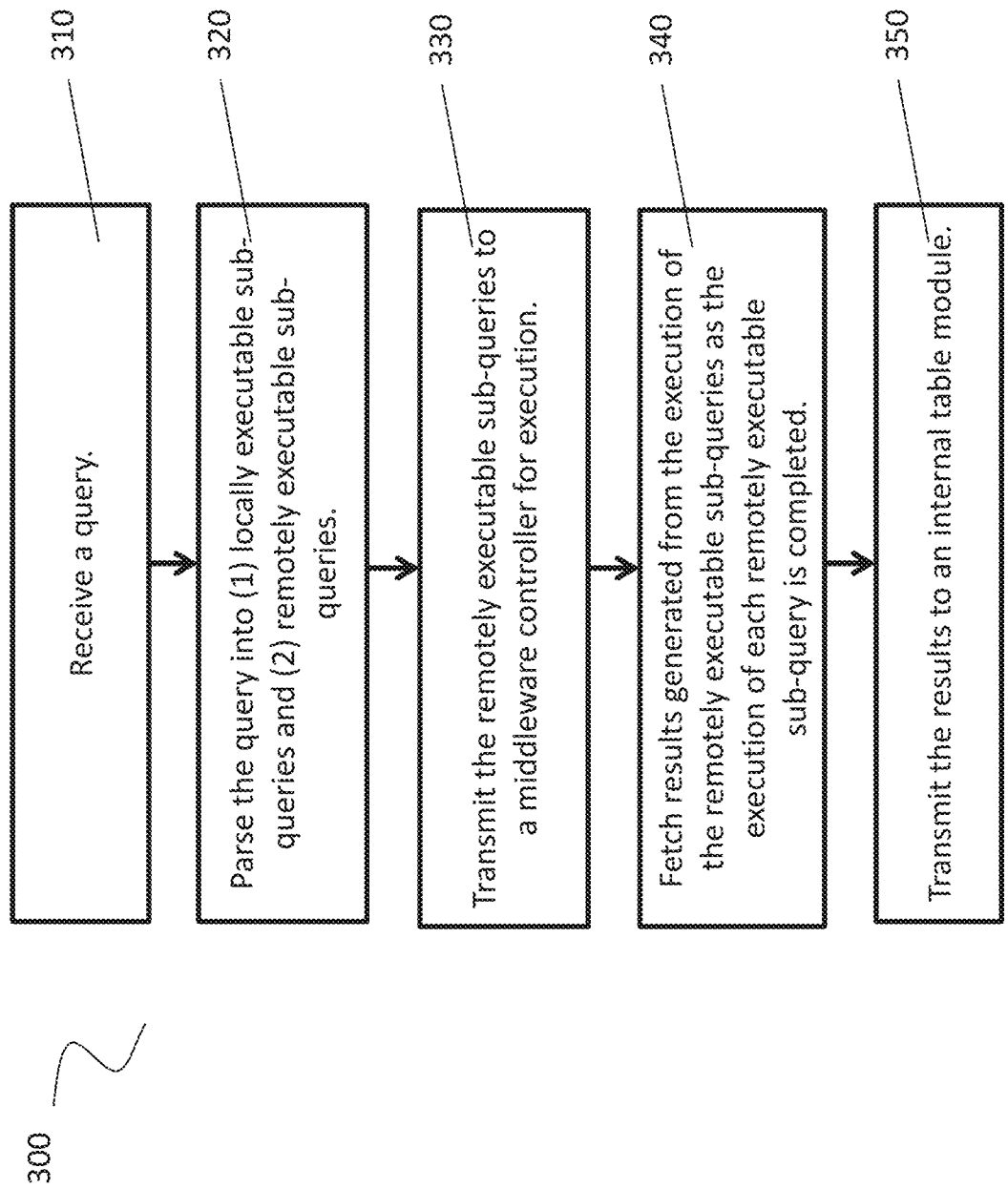
FIG. 3 is a flowchart illustrating a method for operating a middleware adapter, according to some embodiments.

FIG. 3 is flowchart illustrating a method 300 for operating a middleware adapter 133, according to some embodiments. The middleware adapter 133 may act as an interface between a client 110 requesting data or seeking to manipulate data and a database cluster 140 managing data.

Method 300 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1A and 1B. However, method 300 is not limited to that example embodiment.

At 310, a query is received. The query may be received at a middleware adapter 133 and generated in an index server 130 housing the middleware adapter 133. In an embodiment, the query is generated by a client 110 external to the hardware housing the middleware adapter 133. The query may be received via the manipulation of an internal table generated by an index server 130. The query may be in the form of a database query or a query for distributed data. In an embodiment, the query operates in a Spark® engine for managing a Hadoop® cluster. In an embodiment, queries may be requests for data, although this disclosure is not limited to that example. In an embodiment, queries may also include data manipulation, transaction controls, and/or data definition commands.

At 320, the query is parsed into (1) locally executable sub-queries and (2) remotely executable sub-queries. Based on the location of the data to be operated upon by the query, the query may be parsed. If the query involves data local to the middleware adapter 133, such as, for example, data stored in the same hardware, such as an index server 130, the locally executable sub-query is executed by the index server 130. In an embodiment, the index server 130 may already have replicate data in local memory allowing for faster execution. Parsing the query allows for execution in the proper location where data is stored.

In an embodiment, the middleware adapter 133 may generate a query plan. The query plan may include information related to parsing the query into (1) locally executable sub-queries and (2) remotely executable sub-queries. In an embodiment, the remotely executable sub-queries of the query plan include operators for execution at the database cluster 140. In an embodiment, the query plan is configured so that the database cluster 140 can directly execute operators included in the query plan without the need to parse and/or generate a new query plan. The query plan may utilize a tree configuration using the top node of the tree configuration to represent the result of the query. In an embodiment, the query plan may be a file and/or object written in the JavaScript Object Notation® (JSON) or Extensible Markup Language (XML) format. This format may differ from a text or string sub-query format, such as, for example, SQL.

In an embodiment, parsing the query may include function translation capabilities as explained with respect to index server 130 above. In an embodiment, index server 130 may present a client 110 with additional functionality not directly provided by external storage. Index server 130 may provide functions or operators to client 110 that client 110 may use to query data that database cluster 140 does not provide by definition. For example, index server 130 may provide a "calendar week" function that returns the number of the calendar week corresponding to a given day. This function may not exist on the database cluster 140 side due to the capabilities of the nodes 141. Middleware adapter 133 may utilize functional translation to convert the received query into native code and/or binary code. Middleware adapter 133 may also generate a function definition and/or a cache of combined code.

At 330, the remotely executable sub-queries are transmitted to a middleware controller 144 for execution. In an embodiment, the middleware controller 144 resides in a database cluster 140. The database cluster 140 is remote from the middleware adapter 133 and may include various nodes 141 to perform parallel data processing and storage functions. The transmission of the remotely executable sub-queries allows the middleware controller 144 to analyze which nodes 141 of the database cluster 140 contain information relevant to executing the query. The middleware controller 144 may then parse the remotely executable sub-queries into respective node-based sub-queries and transfers the sub-queries to the respective nodes 141. The respective nodes 141 may then execute the respective sub-queries to generate resulting data.

In an embodiment, the remotely executable sub-queries may represent a query plan. At 330, the query plan may be transmitted to the middleware controller 144 for execution.

In an embodiment, the remotely executable sub-queries may represent native code, binary code, a function definition, and/or a cache of combined code. This embodiment may allow an index server 130 to increase the functions capable of being executed when utilizing database cluster 140 on behalf of a client 110. By utilizing the native and/or binary code, middleware adapter 133 may provide additional functionality that may not be available based on the database cluster 140 functions alone. At 330, this native and/or binary code may be transmitted to the middleware controller 144 for execution.

At 340, results generated from the execution of the remotely executable sub-queries are fetched as the execution of each remotely executable sub-query is completed. Rather than waiting until all of the remotely executable sub-queries have been executed, the middleware adapter 133 may directly fetch results generated from the completed execution of a sub-query. This process allows the middleware adapter 133 to receive data as soon as the resulting data is available.

At 350, the results are transmitted to an internal table module 132. In an embodiment, the middleware adapter 133 and internal table module 132 reside within an index server 130. The internal table module 132 generates an internal table organizing information in a centralized manner so that a client may view and manipulate the data available in a database cluster 140. In an embodiment, the internal table stores pointers to nodes 141 housing relevant data without needing to replicate the data directly in the index server 130. As the middleware adapter receives more results, the middleware adapter 133 may continue to pass the updated data to the internal table module.

Figure 4:
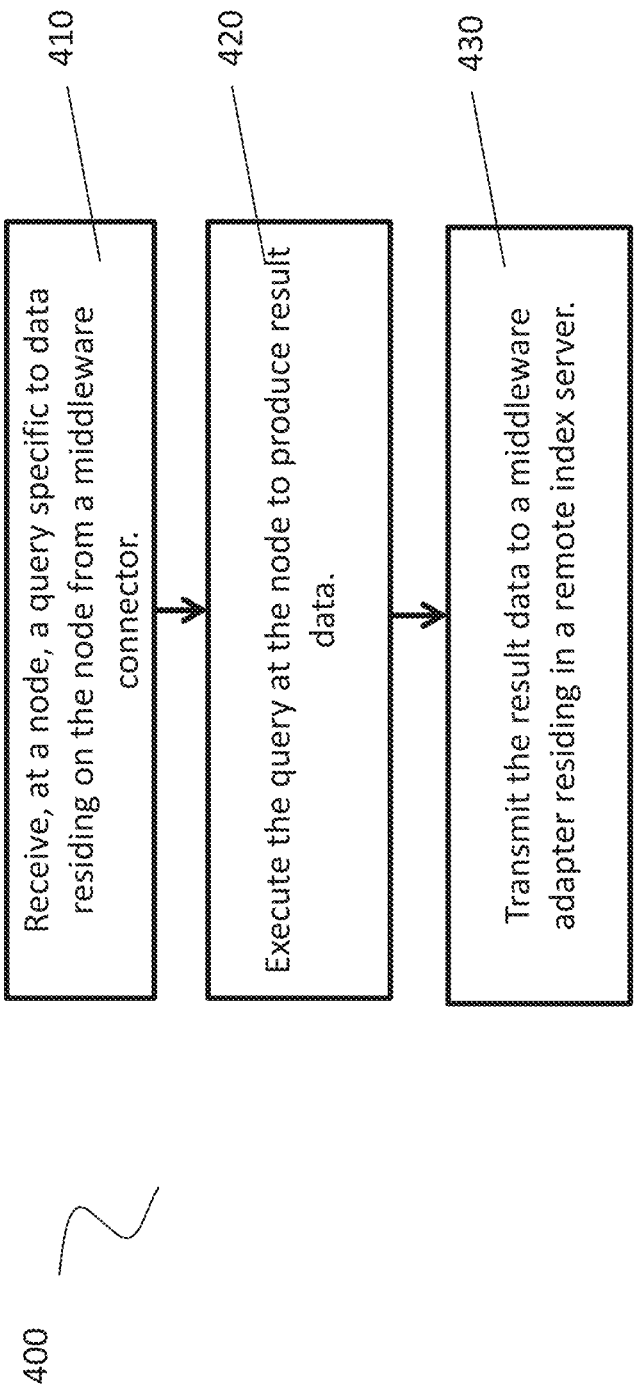
FIG. 4 is a flowchart illustrating a method for operating a node, according to some embodiments.

FIG. 4 is a flowchart illustrating a method 400 for operating a node 141, according to some embodiments. A node 141 may be a piece of commodity hardware or a computing device. Nodes may be aggregated and managed to form a database cluster 140. Method 400 provides a process for operating a node. Method 400 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1A and 1B. However, method 400 is not limited to that example embodiment.

At 410, a query specific to data residing on a node 141 is received from a middleware controller 144. The middleware controller 144 may be implemented on a separate node 141 within a database cluster 140. Because the middleware controller 144 is aware of the data stored on each node 141, the node 141 receiving the data-specific query will be able to execute the query without the need for further parsing.

In an embodiment, the query that the node 141 receives may be a command from a query plan. The command may be in a form configured so that node 141 need not parse the command and instead may directly execute the command from the data provided. For example, node 141 may receive a JSON object rather than SQL query.

At 420, the query is executed by the nodes 141 to produce result data. An example of this execution may be a request for data. The queries may also include data manipulation, transaction controls, and/or data definition. Once a node 141 has executed the sub-query, the result of the execution may be stored in a distributed dataset 142 on the node 141. In an embodiment, the data in the distributed dataset 142 may be shared among nodes 141 to aid in fault tolerance. In an embodiment, to execute the respective node sub-queries, the nodes 141 may need to access extended storage 143 to read and/or manipulate file data. In this case, the nodes 141 may interface with an extended storage 143. In an embodiment, the extended storage 143 is shared among nodes 141 and may be accessed by each node 141. In an embodiment where the nodes 141 are clustered using a Hadoop® configuration and a Spark® engine, the extended storage 143 may be a Hadoop® Distributed File System (HDFS).

At 430, the result data is transmitted to a middleware adapter 133 residing in a remote index server 130. In an embodiment, the middleware adapter 133 monitors the execution status of the node 141 and fetches the data once the execution is complete. In an embodiment, the node 141 transmits a notification to the middleware adapter 133 to signify that execution is complete before transmitting the result data.

Figure 5:
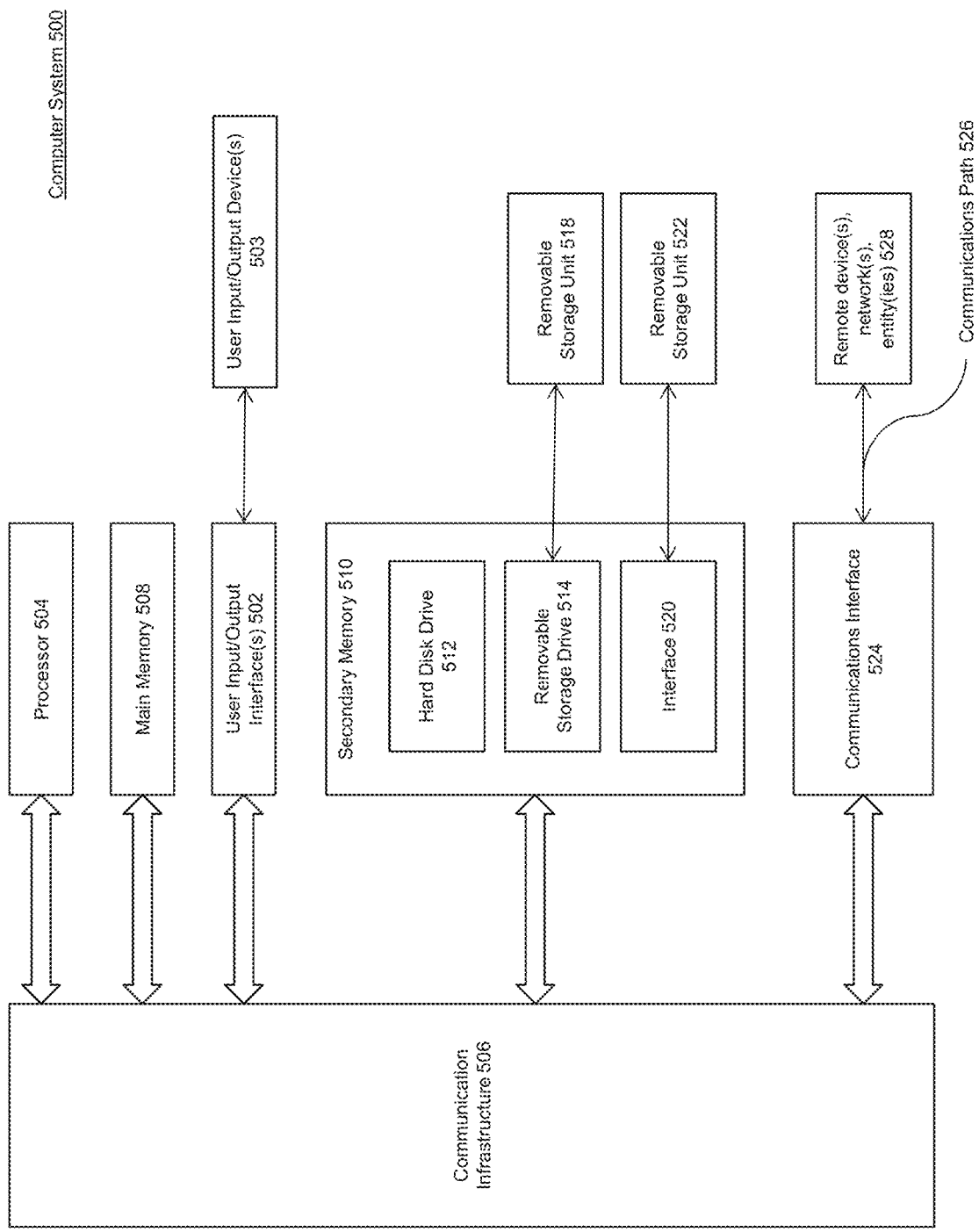
FIG. 5 is an example computer system useful for implementing various embodiments.

Various embodiments can be implemented, for example, using one or more computer systems, such as computer system 500 shown in FIG. 5. One or more computer systems 500 (or portions thereof) can be used, for example, to implement methods 200, 300, and 400 of FIGS. 2-4.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method, comprising:
receiving, by an index server, a query;
parsing, by the index server, the query into (1) a first query plan comprising one or more locally executable sub-queries at the index server and (2) a modified query, wherein the modified query includes one or more operators;
transmitting, by the index server, the modified query to a middleware controller of a database cluster, wherein the middleware controller parses the modified query and generates a second query plan for execution at, and to fetch results from, different nodes of the database cluster; and
directly fetching, by the index server, from each of the different nodes of the database cluster, one or more results generated from execution of the query plan upon completion of execution of an operator at a node of the different nodes without waiting for other nodes of the different nodes to complete execution of respective operators.

2. The computer-implemented method of claim 1, wherein the query is received from interaction with an internal table.

3. The computer-implemented method of claim 1, further comprising loading the results into an internal table accessible by a client device.

4. The computer-implemented method of claim 1, wherein the fetching comprises:
fetching the one or more results generated from execution of the query plan as execution of each of the one or more executable operators is completed without the one or more results passing from the middleware controller to the computing device.

5. The computer-implemented method of claim 1, further comprising:
translating, by the computing device, the query to a native code format; and
transmitting, by the computing device, the translated query to the middleware controller.

6. The computer-implemented method of claim 5, wherein the translated query represents a function undefined by the different nodes.

7. The computer-implemented method of claim 1, wherein a syntax of the query plan differs from a syntax of the query.

8. A system, comprising:
a memory; and
one or more hardware processors configured to:
receive a query;
parse the query into (1) a first query plan comprising one or more locally executable sub-queries and (2) a modified query, wherein the modified query includes one or more operators;
transmit the modified query to a middleware controller of a database cluster, wherein the middleware controller parses the modified query and generates a second query plan for execution at, and to fetch results from, different nodes of the database cluster; and
directly fetch, from each of the different nodes of the database cluster, one or more results generated from execution of the query plan upon completion of execution of an operator at a node of the different nodes without waiting for other nodes of the different nodes to complete execution of respective operators.

9. The system of claim 8, wherein the query is received from interaction with an internal table.

10. The system of claim 8, wherein the one or more hardware processors are further configured to load the results into an internal table accessible by a client device.

11. The system of claim 8, wherein the one or more hardware processors are configured to fetch the one or more results without the one or more results passing from the middleware controller to the one or more processors.

12. The system of claim 8, wherein the one or more hardware processors are further configured to:
translate the query to a native code format; and
transmit the translated query to the middleware controller.

13. The system of claim 12, wherein the translated query represents a function undefined by the different nodes.

14. The system of claim 8, wherein a syntax of the query plan differs from a syntax of the query.

15. A tangible, non-transitory computer-readable device having instructions stored thereon that, when executed by at least one computing device, causes the at least one computing device to perform operations comprising:
receiving a query;
parsing the query into (1) a first query plan comprising one or more locally executable sub-queries and (2) a modified query, wherein the modified query includes one or more operators;
transmitting the modified query to a middleware controller of a database cluster, wherein the middleware controller parses the modified query and generates a second query plan for execution at, and to fetch results from, different nodes of the database cluster; and
directly fetching, from each of the different nodes of the database cluster, one or more results generated from execution of the query plan upon completion of execution of an operator at a node of the different nodes without waiting for other nodes of the different nodes to complete execution of respective operators.

16. The tangible, non-transitory computer-readable-device of claim 15, wherein the query is received from interaction with an internal table.

17. The tangible, non-transitory computer-readable-device of claim 15, the operations further comprising loading the results into an internal table accessible by a client device.

18. The tangible, non-transitory computer-readable-device of claim 15, wherein the fetching comprises:
   fetching the one or more results generated from execution of the query plan as execution of each of the one or more executable operators is completed without the one or more results passing from the middleware controller to the computing device.

19. The tangible, non-transitory computer-readable-device of claim 15, the operations further comprising:
   translating the query to a native code format; and
   transmitting the translated query to the middleware controller.

20. The tangible, non-transitory computer-readable-device of claim 19, wherein the translated query represents a function undefined by the different nodes.

\* \* \* \* \*